April 5, 1966 E. A. BARTKUS ETAL 3,243,870

METHOD OF MAKING AN ARRAY OF MAGNETIC STORAGE ELEMENTS

Filed Jan. 23, 1963 2 Sheets-Sheet 1

INVENTORS
EDWARD A. BARTKUS
JAMES M. BROWNLOW
ROBERT F. ELFANT
KURT R. GREBE

BY George Baron
ATTORNEY

April 5, 1966 E. A. BARTKUS ETAL 3,243,870

METHOD OF MAKING AN ARRAY OF MAGNETIC STORAGE ELEMENTS

Filed Jan. 23, 1963 2 Sheets-Sheet 2

United States Patent Office 3,243,870

Patented Apr. 5, 1966

3,243,870

METHOD OF MAKING AN ARRAY OF MAGNETIC STORAGE ELEMENTS

Edward A. Bartkus, Yorktown Heights, James M. Brownlow, Crompond, Robert F. Elfant, Yorktown Heights, and Kurt R. Grebe, Beacon, N.Y., assignors to International Business Machines Corporation, New York, N.Y., a corporation of New York Filed Jan. 23, 1963, Ser. No. 253,467
7 Claims. (Cl. 29—155.5)

This invention relates to a connected array of magnetic circuit elements which are suitable for use as memory planes in digital information storage systems and to the process of fabrication of such arrays.

In a copending application entitled, "Arrays of Magnetic Circuit Elements and Process of Preparation" filed by James M. Brownlow et al. on June 29, 1962, Serial No. 206,326, there is shown a technique for making such arrays. Broadly speaking, the invention shown and described in such copending application consists of dipping electrically conducting wires in a waxy material, then depositing a continuous coating of a ferrite-thermosetting resinous mixture onto such waxy coatings, and then attaching such wires onto a frame. A second series of parallel wax-coated and ferrite-resin coated conductive wires are placed on a second frame. The two frames are assembled so that the first and second series of ferrite-resin coated wires are placed at right angles to one another. The entire assembled array is heat cured and sintered to increase the bonding of the ferrite-resin coatings to each other at the junctions of such wires as well as to produce a magnetic memory array.

Another copending application assigned to the same assignee as the instant application, entitled, "Magnetic Memory" was filed June 29, 1962 in the names of Robert F. Elfant and Kurt R. Grebe, Serial No. 206,356, discloses a mode of operation for storing information into and reading information out of a memory element. The memory element is a wire conductor surrounded by a magnetic material to form a tubular element. Oppositely disposed apertures are cut along the tubular element and a conductor threads each pair of oppositely disposed apertures, the axis of such threaded conductor being transverse to the wire conductor of the tubular element. It is to be understood that there are ways other than the mode taught in said Elfant et al. application for recording and reading information. The present invention deals with the manner of improving the storage of information at such junctions, regardless of the specific mode chosen for recording and/or reading of information stored at such junctions, such improvement being concerned with obtaining uniform flux storage at every junction throughout the memory array.

As was disclosed in such copending application by Robert F. Elfant et al., a current is applied to a selected conductor in one tube of a first parallel group of tubes to create a remanent flux orientation that is circumferentially disposed in a magnetic material surrounding the selected conductor and which flux orientation is parallel to a second wire conductor, called the bit driver, that is at right angles to said conductor of the first selected tube. Current through the bit driver will locally warp such circumferential flux orientation. Such local warping of the flux orientation, or lack of warping, can be used to indicate binary storage.

In mass production techniques for making tubular bulk memories, it is very important that the junctions created by the two groups of parallel elements namely, the tubular element and its associated bit driver element, each have a flux storage capacity that is similar to, or not depart significantly from, any other junction. The present invention provides this uniformity in the following manner: A first group of wax-coated conductive wires is surrounded with a ferrite-resinous mixture and placed in a frame to provide a taut parallel group of tubular elements. A second group of bare or wax-coated conductive wires are placed on a second frame to produce a second group of taut parallel wires. The second group of bare or wax-coated conductors are placed at right angles to, and in a plane parallel to, the first group. When so placed, the second group of wires sinks into a portion of the viscous ferrite-resin material surrounding the first group of wires. In so doing, the amount of viscous material surrounding the sunken wires may not be uniform, resulting in non-uniform magnetic flux storage capacities about the submerged wires when the memory element is subsequently pyrolyzed and sintered.

In order to obtain the benefits of using bare or wax-coated wires as the bit drivers in a multibit magnetic memory, yet retain the advantages of uniform flux storage capacity, applicants employ the following process. They have taken an uncured piece of a ferrite-resinous mixture and have placed it along the entire length of each ferrite resin coated wire of said first group so as to completely cover the junctions so formed by the wires of the second group with the viscous tubular coatings of the first group. When ordinary drying and curing take place, the aforesaid junctions attain uniform flux storage capacities, resulting in more reliable memory elements.

Consequently, it is an object of the invention to provide improved high capacity magnetic storage elements.

A further object is to fabicate large capacity magnetic storage elements wherein the probability of noise taking place during recording of information is substantially reduced.

Another object is to improve the magnetic flux characteristics at every bit location of a large capacity magnetic memory.

Yet another object is to provide a large capacity storage array that is relatively easy to manufacture and exceedingly simple in its construction.

The foregoing objects, features and advantages of the invention will be apparent from the following more particular description of preferred embodiments of the invention as illustrated in the accompanying drawings.

Figures 7, 8:
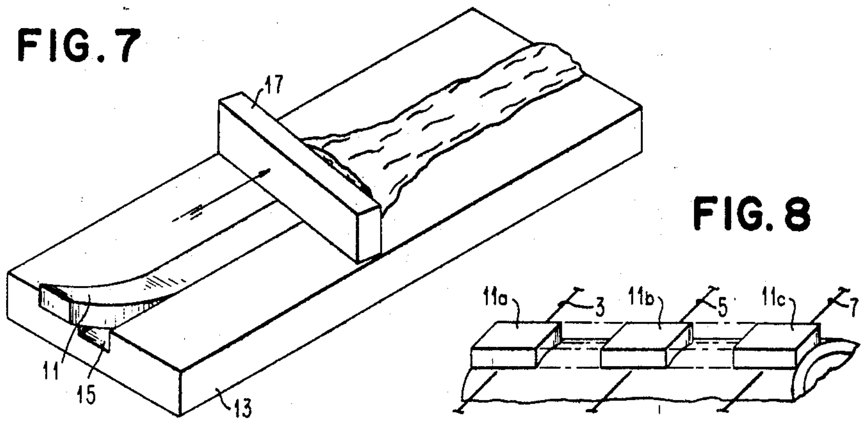

FIGURE 7 indicates the manner in which a uniform overlayer is produced so as to carry out the objects of the present invention.

FIGURE 8 is another embodiment of the present invention.

Figure 1:
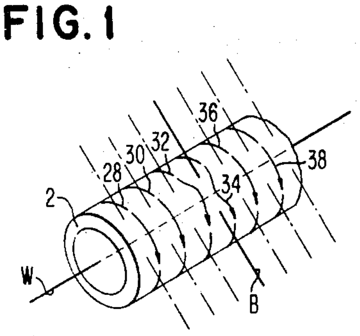
FIGURE 1 illustrates a stable state of remanent flux orientation and distribution in a memory element of the present invention.
Figure 3:
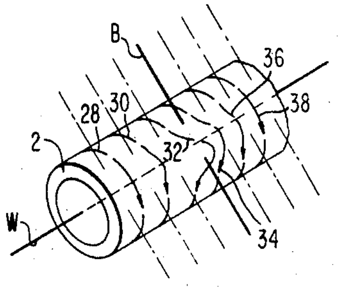
FIGURE 3 illustrates a stable state of flux orientation similar to that of FIGURE 1 but having a different distribution of FIGURE 1.
Figure 2:
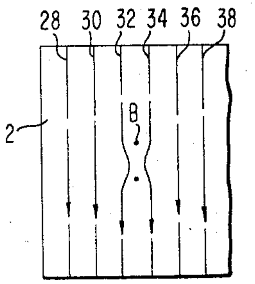
FIGURE 2 is a developed view of such remanent flux orientation and distribution.
Figure 4:
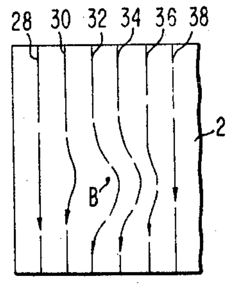
FIGURE 4 is a developed view of the remanent flux orientation and distribution of FIGURE 3.
Figure 6:
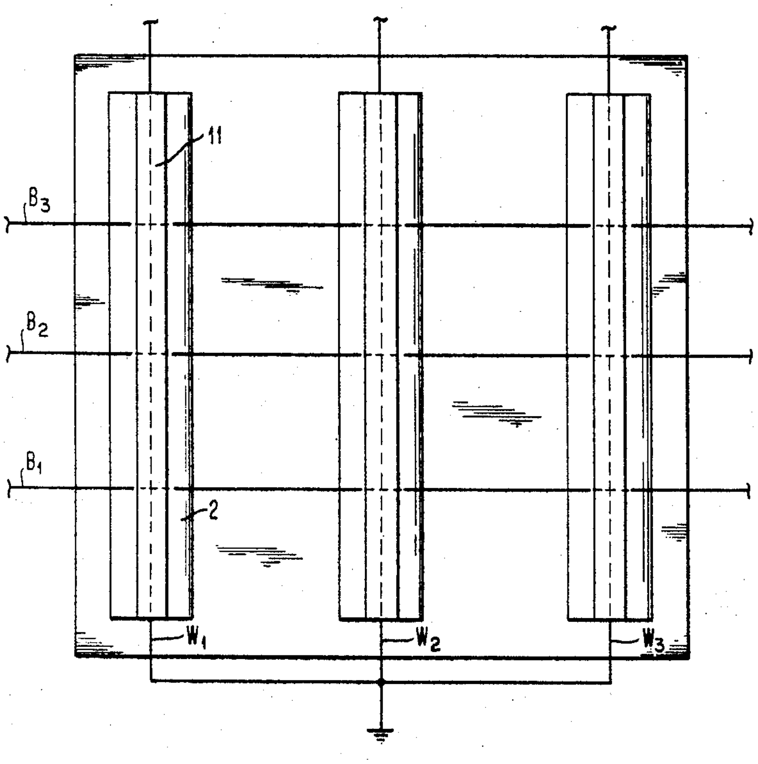
FIGURE 6 is a showing of the invention as applied to an entire memory array.

Turning to FIGURE 1, a schematic illustration is shown of a first conductor word W and a second conductor or bit driver B displaced from and in orthogonal relationship with each other. There can be as many bit driver elements B employed as there are bits to the word that will be stored on the outer circumference of tubular element 2. Tubular element 2 would be a sintered ceramic ferrite material having a hysteresis loop of such characteristics that when current pulse is applied to conductor W a remanent flux is stored on the outer periphery of said tube, such remanent flux being shown by the curves 28, 30, 32, 34, 36 and 38. The orientation of the flux as shown in FIGURE 1 could be considered as the "0" state of the memory bit and would encompass that area on the surface of tube 2 intersected by a bit driver B and tube 2. As shown in FIGURE 2, the bit driver B which penetrates the tubular member 2 has no flux linkage associated with it, so that for reading purposes a sensing device would not sense a cutting of said bit driver B by a changing magnetic field. However, when a "1" is to be stored in the vicinity of a bit driver B, at the same time that current is applied along word driver W to create the circumferential flux pattern 28, 30, 32 etc., a bit driver B will also be energized to conduct current. Such energization of a given bit conductor or driver will cause a transverse flux orientation to be created which warps the circumferential flux orientation of tube 2 at the junction of the current carrying conductor B with the tubular element 2, leaving a warped magnetic flux orientation after energization has terminated. Such flux linkage of the warped field with a bit conductor B is shown in FIGURE 4. Consequently, when bit driver B is used as a sensing element during a subsequent read cycle, one may sense this flux linkage to indicate the storage of a "1" at the particular junction between the tubular element 2 and the bit driver B. As can be seen more readily in FIGURE 6, one can obtain parallel read in and parallel read out of a multibit word, the array indicating only three words $W_1$, $W_2$, $W_3$, and three bit drivers $B_1$, $B_2$, $B_3$.

Figure 5:
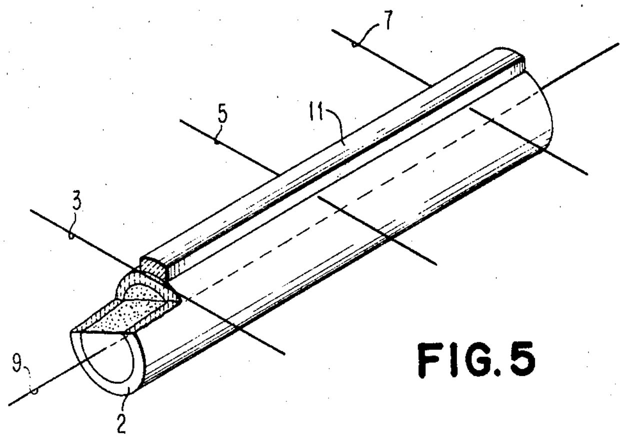
FIGURE 5 shows the preferred embodiment of the present invention.

The copending patent application entitled, "Magnetic Element and Memory" filed by Robert F. Elfant and Nicholas J. Mazzeo discusses in greater detail the manner in which one may read into and read out of a large magnetic storage array using the principle discussed relative to FIGURES 1 and 4. The manner of reading in and reading out of such memory does not form a part of this invention. The features to be described hereinafter that comprises applicants' contribution relates to a method and means for improving the storage characteristics at the point at which the bit driver B and the tubular ceramic ferrite element 2 intersect. Turning to FIGURE 5, there is shown a single tube 2 which will be employed as a magnetic storage element for storing a multibit word. The drawing indicates that the word can be chosen to be of any length desired. Lines 3, 5 and 7 are just three of the bit drivers shown associated with a given word. It is understood that such bit drivers will be associated with other tubes, not shown, which will also serve as word storing devices. The tubular word storage element 2 may consist of a central wire 9 made of annealed palladium, copper, platinum, silver or any other suitable heat conducting and electrically conducting wire coated with wax. The annealing serves to preclude distortion of the wire in subsequent heating steps of the process. Such waxes may be beeswax, carnauba wax, polyethylene wax, paraffin wax etc. The assembly is deposited in a ferrite-resin-thermosetting mixture. A representative, though not limiting, mixture would be a calcined ferrite powder dispersed in a thermosetting resin with suitable catalyst plasticizers and/or viscosity control agents. The calcined ferrite powder is present in an amount 40% to 80% by weight. The thermosetting resin is present in an amount of 5% to 60% by weight. The plasticizers are viscosity control agents and are present in an amount of from 0% to 30% by weight. Almost all calcined ferrite powders which exhibit a remanence to saturation ratio greater than 0.5 when sintered are suitable for use in such ferrite-resin mixture. The resins employed with the calcined ferrite powder are thermosetting resins such as, for example, epoxy resins, polyester resins, melamine-formaldehyde resins, phenol aldehyde resins etc.

The ferrite-resin coated wires 9 (see FIGURE 5) are mounted on a frame in parallel alignment. A second series of similarly conductive wires 3, 5 and 7 are mounted on a second frame. However, in the second set of parallel wires, the latter are left bare or only a deposit of wax is placed over wires 3, 5 and 7 etc. The two frames are joined so that the waxed wires of the upper frame contact at right angles, the viscous wires on the bottom frame to form a matrix array. The top wires sink slightly into the viscous wires beneath them.

As seen in FIGURE 7, uniform overlayer material 11 is formed in a mold 13. The mold 13 is made of silastic material, normally a silicon rubber composition, having a channel 15 therein. A prescribed amount of ferrite-resin material is spread within the channel 15 and the surplus amount of ferrite-resin material is removed from the mold 13 by a trowel 17. The additional overlayer 11 sets after being kept for about twelve hours at room temperature, after which time it is an uncured length of ferrite-resin material, said length being an integral self-supporting member, but pliable. Obviously, other setting times will be used with other materials chosen for such overlayer. This overlayer 11 material is placed in intimate contact with tubular member 2, as shown in FIGURE 5, so that bit drivers 3, 5 and 7 lie between such overlayer 11 and the outer surface of tubular member 2. The entire structure is now cured so that the overlayer 11 forms a homogeneous unit with tubular element 2.

As disclosed in co-pending application, Serial No. 206,326, there are many compositions that can be selected for practicing the invention. Merely for illustrative purposes, one example for practicing the invention will be described. A five mil diameter platinum wire is selected for the word driver line 9 and it is built up to a 10 mil diameter by a polyethylene wax coating by passing such wire 9 vertically through a liquid bath of the polyethylene wax and then through a warm dye having a 12 mil inside diameter. The thus wax-coated wire 9 is then passed through a ferrite-resin mixture composed of calcined ferrite powder, $Fe_{1.7}Mn_{1.26}Cu_{0.04}O_4$, present in an amount of 35 grams. The mixture also contains 6 grams of pine oil and 9.0 grams of a mixture having a viscosity of 250 centipoises comprising 8.1 grams of an epoxy resin prepared by reacting bisphenol A and epicholohydrin and 0.8 gram triethylene tetraamine.

The rate of passage of the wire through this liquid mixture is such as to produce a 5 mil coating thickness immediately following the coating step. The coated wires are mounted in parallel alignment on an open frame (0.05 inch on centers). A similar frame of wire is arranged on a second frame, but the second frame contains only a bare or a wax-coated parallel group of wires. The two frames are orented in a fixture so that wires of the second frame are perpendicular to and in a plane parallel to the wires of the first frame. As was noted above, when the two frames are pressed together, each of the wires 3, 5, and 7 is sufficiently embedded in its immediate viscous environment on tubular elements 2 so that the uniform overlayer 11 can be adapted to cover the junctions of the wires 3, 5 and 7 and the periphery of tubular element 2.

A representative overlayer 11 would be produced by curing the latter in air at room temperature for about twelve hours. The overlayer would be about 3 to 10 mils thick and 5 to 15 mils wide. Once the overlayer 11 is applied to the tubular element 2, the grid of wires 3, 5 and 7 etc. overcome the natural tendency for the overlayer 11 to sink into the viscous ferrite-resin that encircles wire 9 so that the overlayer 11 just makes contact with the tube of ferrite-resinous mixtures.

If desired, the overlayer 11 can be disposed in individual segments, **11*a*, 11*b*, 11*c*** etc. as shown in FIGURE 8. This feature may be employed with an automatic feed mechanism to dispense individual strips of uncured ferrite material.

The two frames supporting the respective wires are held together and the entire assembly is allowed to dry on the respective frames for about 15 minutes at 100° C. The temperature of the entire assembly is raised to 600° C. in a period of 2 hours. It is held at 600° C. for 1 hour. The resin and organic compounds are burned and pyrolyzed during this two hour period. The array is then heated from 600° C. to 1150° C. for approximately 1 hour. It is held at 1150° C. for 20 minutes. It is cooled to 1000° C. in 20 minutes, held at 1000° C. for 10 minutes and then rapidly cooled to room temperature. The final product is an array of polycrystalline ceramic ferrite magnetic storage elements.

It has been discovered that uniform magnetic characteristics are dependent upon the minimum cross-section of ferrite material in tube 2 seen by a bit driver, such as bit driver 3. The process described hereinabove produces an overlayer 11 wherein the area seen by each bit driver is substantially the same. This area seen by the bit driver is very critical for storing information and it is necessary that the area be made uniformly throughout multibit memory devices. The proposed method and means described herein permits one to obtain uniform flux orientations throughout the memory so that the storage of a "1" at any bit position will contain substantially the same amount and direction of flux orientation as the storage of a "1" anywhere in the memory would contain. The described method creates uniform deposition with consequent uniform flux storage.

It is understood that while the invention is shown to include an overlayer 11 that covers the entire length of a word as represented by tube 2, individual blocks or strips of overlayer material can be applied discretely at the intersections of each bit driver 3 with a word tube 2. It is also understood that the material in the strip should be one that has good magnetic remanence properties whereas the tube material 2 need only have good magnetic transformer properties and need not necessarily exhibit good magnetic remanence. Thus, less expensive materials can be employed to construct magnetic memories, savings that would be noticeable when memories having as many as a billion bits of information are constructed.

While the invention has been shown and described with reference to preferred embodiments thereof, it will be understood by those skilled in the art that various changes in form and details may be made therein without departing from the spirit and scope of the invention.

What is claimed is:

1. The process of fabricating a sintered ferrite magnetic storage element capable of storing a plurality of bits of information in the form of a flux distribution which comprises:

(a) depositing a first continuous coating of a waxy material on the surface of a conducting tubular element,
(b) thereafter depositing a second continuous coating of a ferrite-resin mixture on said first coating wherein such second continuous coating is in a viscous state,
(c) mounting a plurality of electrically conductive wires onto an assembly so as to produce a parallel group of wires,
(d) disposing the parallel group of wires orthogonally to and in contact with such continuous viscous coating,
(e) placing a strip of uncured ferrite-resin mixture on top of each such produced contact,
(f) heating the structure thus formed until pyrolysis, and
(g) sintering and cooling said structure to produce thereby a wired array of magnetic storage elements.

2. The process of fabricating a sintered ferrite magnetic storage element capable of storing a plurality of bits of information in the form of a flux distribution which comprises:

(a) depositing a first continuous coating of a waxy material on the surface of a conducting tubular element,
(b) thereafter depositing a second continuous coating of a ferrite-resin mixture on said first coating wherein such second continuous coating is in a viscous state,
(c) mounting a plurality of wax-coated conductive wires onto an assembly so as to produce a parallel group of wires,
(d) disposing the parallel group of wires orthogonally to and in contact with such continuous viscous coating,
(e) placing a continuous strip of uncured ferrite-resin mixture across the entire top of said viscous tubular element so as to cover each such produced contact,
(f) heating the structure thus formed until pyrolysis, and
(g) sintering and cooling said structure to produce thereby a wired array of magnetic storage elements.

3. The process of fabricating a connected sintered ferrite magnetic storage element capable of storing a plurality of bits of information in the form of a flux distribution which comprises:

(a) depositing a first continuous coating of a waxy material on the surface of a conducting tubular element,
(b) thereafter depositing a second continuous coating of a ferrite-resin mixture on said first coating wherein such second continuous coating is in a viscous state,
(c) mounting a plurality of wax-coated conductive wires onto an assembly so as to produce a parallel group of wires,
(d) disposing the parallel group of wires at an angle to and in contact with such continuous viscous coating,
(e) placing a strip of uncured ferrite-resin mixture on top of each such produced contacts,
(f) heating the structure thus formed until pyrolysis, and
(g) sintering and cooling said structure to produce thereby a wired array of magnetic storage elements.

4. The process of fabricating a sintered ferrite array of magnetic storage elements which comprises:

(a) depositing a first continuous coating of a waxy material on the surface of a plurality of conductive wires,
(b) thereafter depositing a second continuous coating of a ferrite-thermosetting-resin mixture on said first coating,
(c) mounting said ferrite-thermosetting-resin coated conductive wires on a frame to form thereby a first series of parallel ferrite-resin coated conductive wires,
(d) mounting a second conductive wax-coated wire onto a second frame to form a second series of parallel wires,
(e) disposing the second series of parallel wires orthogonally to and in contact with said second continuous coating on each of said first series of parallel wires,
(f) placing an uncured pliable ferrite-resin mixture strip on top of each such produced junction,
(g) heat curing the assembled array to pyrolysis, and
(h) sintering and cooling said structure to thereby produce an array of polycrystalline ferrite magnetic storage elements.

5. The process of fabricating a ferrite array of magnetic storage elements which comprises:

(a) depositing a first continuous coating of a waxy material on the surface of a plurality of conductive wires,
(b) thereafter depositing a second continuous coating of a ferrite-thermosetting-resin mixture on said first coating,
(c) mounting said ferrite-resin coated conductive wires on a frame to form thereby a first series of parallel ferrite-resin coated conductive wires,
(d) mounting a second plurality of wax-coated conductive wires onto a second frame to form a second series of parallel wires,
(e) disposing the second series of parallel wires orthogonally to and in contact with said second continuous coating on each of said first series of parallel wires, and (f) placing an uncured ferrite-resin mixture strip at each such produced junction prior to pyrolyzing and sintering said entire assembly.

6. The process of fabricating a ferrite array of magnetic storage elements which comprises:

(a) depositing a first continuous coating of a waxy material on the surface of a plurality of conductive wires, (b) thereafter depositing a second continuous coating of a ferrite-thermosetting-resin mixture on said first coating, (c) mounting said ferrite-resin coated conductive wires on a frame to form thereby a first series of parallel ferrite-resin conductive wires, (d) depositing a continuous coating of a waxy material on the surface of a second plurality of conductive wires, (e) mounting said second plurality of wax-coated conductive wires on a second frame to form a second series of parallel wires, (f) disposing the second series of parallel wires orthogonally to and in contact with said second continuous coating on each of said first series of parallel wires, (g) placing an uncured ferrite-resin strip along the length of each wire of said first series so as to cover each junction that said second series of wires makes with said first series of said wires, (h) and heat curing the assembled array to increase the bonding of said strip to its ferrite-resin undercoating so as to make more uniform the magnetic flux characteristics of each junction.

7. The process of fabricating a ferrite array of magnetic storage elements which comprises:

(a) depositing a first continuous coating of a ferrite-thermosetting-resin mixture on the surface of a plurality of conductive wires, (b) mounting said ferrite-resin coated conductive wires on a frame to form thereby a first series of parallel ferrite-resin conductive wires, (c) mounting a second plurality of conductive wires on a second frame to form a second series of parallel wires, (d) depositing the second series of parallel wires orthogonally to and in contact with said continuous coating on each of said first series of parallel wires, (e) placing an uncured ferrite-resin strip along the length of each wire of said first series so as to cover each junction that said second series of wires makes with the coatings of said first series of wires, and (f) heat curing the assembled array so as to increase the bonding of said strip to its ferrite-resin undercoating to provide more uniform magnetic flux characteristics at each junction.

References Cited by the Examiner

UNITED STATES PATENTS

| | | | |
|---|---|---|---|
| 3,099,874 | 8/1963 | Schweizerhof ------ | 29—155.5 |
| 3,100,295 | 8/1963 | Schweizerhof ----- | 29—155.5 X |

JOHN F. CAMPBELL, *Primary Examiner.*